H. G. CARLSON.
TEMPORARY CLOSING DEVICE FOR PIPES.
APPLICATION FILED OCT. 19, 1914.
1,174,055.
Patented Mar. 7, 1916.
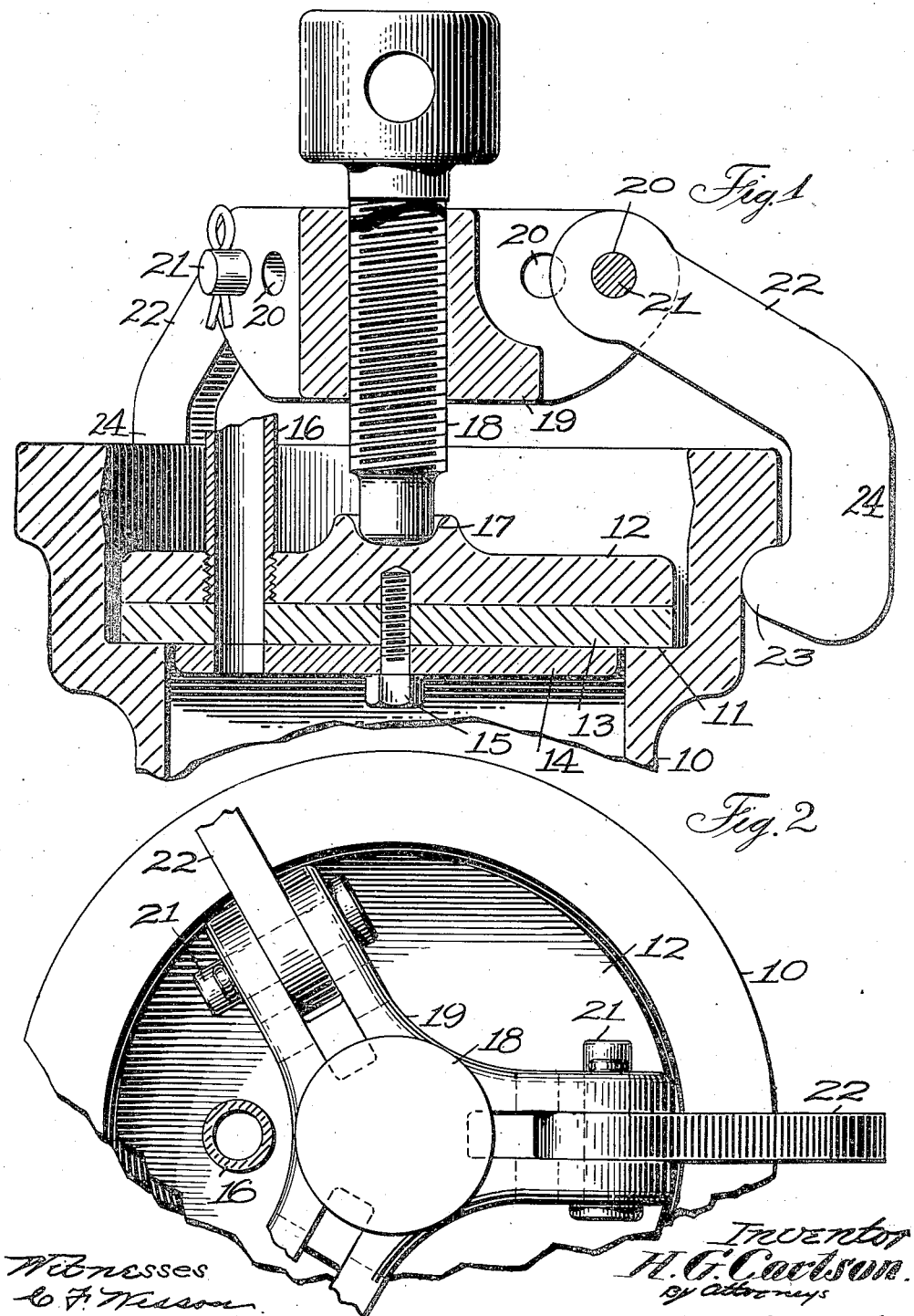

UNITED STATES PATENT OFFICE.

HJALMAR G. CARLSON, OF WORCESTER, MASSACHUSETTS, ASSIGNOR TO ROCKWOOD SPRINKLER COMPANY OF MASSACHUSETTS, A CORPORATION OF MASSACHUSETTS.

TEMPORARY CLOSING DEVICE FOR PIPES.

1,174,055.   Specification of Letters Patent.   Patented Mar. 7, 1916.

Application filed October 19, 1914. Serial No. 867,339.

*To all whom it may concern:*

Be it known that I, HJALMAR G. CARLSON, a citizen of the United States, residing at Worcester, in the county of Worcester and State of Massachusetts, have invented a new and useful Temporary Closing Device for Pipes, of which the following is a specification.

This invention relates to a device for temporarily closing the bell-end of a pipe while it is being tested.

The principal objects of the invention are to provide a simple and practical means for this purpose which will do the work in a satisfactory manner and will have such a direction of action that the hooks with which it is provided will tend to grip under the flange of the pipe, and no external means will have to be provided to hold the device in place.

Further objects and advantages of the invention will appear hereinafter.

Reference is to be had to the accompanying drawings, in which—

Figure 1 is a longitudinal central sectional view of the bell-end of a pipe showing a preferred embodiment of this invention applied thereto, and Fig. 2 is a plan of a portion thereof.

Pipes for conducting water and for other purposes are tested ordinarily by sealing up the end and then introducing water under pressure until the pressure within reaches a certain amount. After the test is made the seal has to be removed, and if this seal is made as usual by casting lead around the joints or in any similar way, both the making of the seal and clearing of it away consumes considerable time and some times results in injury to the pipe. This invention is designed for the purpose of providing an arrangement of parts of such a nature that the hooks which are designed to engage under the flange of the pipe will normally tend to pull inwardly toward the center, and consequently will have no tendency to slip off the flange of the pipe as has been the case with constructions proposed heretofore for sealing pipes in a similar way. This is advantageous for the reason that the pipe flange is usually very narrow. Devices which have been designed for this purpose have been of such a nature that the hooks pull in substantially a longitudinal direction with respect to the pipe, and consequently they have a tendency to be displaced from under the flange and move outwardly therefrom. This has necessitated putting additional features in sometimes, even clamps, to hold the hooks in position. This is done away with according to this invention. In the drawings the seal is applied to the bell end of a pipe 10 having a flat seat 11 therein as usual. For the purpose of closing this end of the pipe a flat valve plate 12 is provided having a rubber or other soft plate or cushion 13 on the bottom held in place by a plate 14 and screw 15. These parts are perforated and a pipe 16 screwed into the perforation through which the water can be introduced for the purpose of testing.

The plate 12 is provided with a central seat 17 for receiving the end of a pressure applying device preferably in the form of a screw 18. This screw is carried by a head 19 adapted to be spaced from the end of the pipe and provided with two series of perforations 20 in ears thereon through which pivot pins 21 can be inserted for the purpose of pivoting a series of holding arms 22 thereon. These pivots are located at a point inside the circumference of the bell end of the pipe so that the arms 22 will draw inwardly toward the center when the pressure is applied. These arms accordingly are made with a slanting portion adjacent to the pivot end and they terminate in an inner projection 23 at the bottom of the vertical portion 24. This projection 23 is adapted to engage under the flange of the pipe and as the pressure is applied by the screw the force will tend to move these ends inwardly and securely hold the parts in position. Two sets of perforations 20 are shown, one nearer the center than the other for the purpose of permitting the use of the head 19 with pipes and valve plates of different sizes.

In the use of the device the valve is placed in position on its seat; the head is then placed over the end of the pipe in alinement therewith, the screw being brought into the seat 17, and the projections 23 under the flange. Then the screw is turned to apply any necessary degree of pressure and water is turned on through the pipe 16. This water is applied under the necessary head to secure the pressure to which the test is to be run. When the test has been made the water is shut off, the screw loosened and the arms 22 turned away. Then the head and valve can be removed separately and used again without necessitating any work on the pipe itself.

Although I have illustrated and described only a single embodiment of the invention I am aware of the fact that many modifications can be made therein by any person skilled in the art without departing from the scope of the invention as expressed in the claim. Therefore, I do not wish to be limited to all the details of construction herein shown and described, but What I do claim is:—

In a temporary closing device for the bell end of a pipe, the combination with a valve adapted to seat in the pipe, of a flat head smaller than the valve arranged parallel therewith and having a plurality of series of perforations therein at different distances from the center, means supported by said head for applying pressure to said valve, and arms adapted to be pivoted to said head at any set of perforations and having inwardly extending projections for engaging under the flange of the pipe, each arm being so located and arranged that a line drawn from the end of its projection where it engages the pipe to the point at which the arm is connected with the head will slant inwardly toward the center of the head.

In testimony whereof I have hereunto set my hand, in the presence of two subscribing witnesses.

HJALMAR G. CARLSON.

Witnesses:
 DONALD WM. ORMSBEE,
 HARVEY C. S. ASHEY.